Aug. 15, 1961     R. D. TOLLEFSON     2,996,708
STABILIZED FREQUENCY OFFSET DOPPLER SYSTEM
Filed Nov. 21, 1958

INVENTOR.
ROBERT D. TOLLEFSON
BY Moody and Goldman
ATTORNEYS

United States Patent Office 2,996,708
Patented Aug. 15, 1961

2,996,708
STABILIZED FREQUENCY OFFSET DOPPLER SYSTEM
Robert D. Tollefson, Cedar Rapids, Iowa, assignor to Collins Radio Company, Cedar Rapids, Iowa, a corporation of Iowa
Filed Nov. 21, 1958, Ser. No. 775,643
3 Claims. (Cl. 343—8)

This invention relates to an improvement in doppler radar systems.

Prior doppler radar systems are well known in the art. A prior type pertinent to the present invention is one capable of sensing the direction of a doppler-frequency shift as well as its magnitude. The direction of the frequency displacement tells whether a target is moving toward or away from the doppler transmitter. To sense the direction of doppler shift, it is necessary that the received wave be heterodyned to an intermediate-frequency level, at which the signal is detected by a frequency discriminator. The opposite output polarities available from the discriminator indicate respective directions of the frequency shift.

In prior doppler radar systems having direction discrimination, a side-step oscillator was used to enable the received frequency to be heterodyned to the intermediate-frequency level rather than down to direct-current level where direction sensing would be lost. A side-step oscillator herein provides a local oscillation that has a frequency equal to an intermediate-frequency found in the apparatus; and a side-step mixer generates a local heterodyning frequency by beating a transmitted frequency with the frequency of the side-step oscillator.

However, there unavoidably exists direct coupling between the transmitting and receiving portions of a doppler radar system due to close proximity of its transmitting and receiving antennas. Even though the antennas are positioned at minimum points in their respective radiation patterns, there remains in practice a relatively large amount of energy directly provided from the transmitting to the receiving antenna portions. That is, the direct-coupled energy is large compared to the reflected signal having the doppler displacement, because the target is generally quite distant from the antenna and the signal is highly attenuated during its propagation and reflection.

Accordingly, it becomes necessary at the receiver to provide some means for filtering out the direct-coupled energy, because it does not contain the required information and interferes with the signal. Due to the fact that the desired and undesired frequencies are very closely spaced percentage-wise, filtering problem may become acute. Even when filters of proper selectivity are found, there still exists the difficulty of filter stabilization with respect to the side-step oscillator frequency. For example, temperature variation may cause the frequency of the side-step oscillator to drift away from the tuned frequency of an attenuating filter to the point where the entire radar system may fail to operate properly.

This invention teaches how the side-step frequency and the center frequency of an attenuating filter of direct-coupled energy may be locked together without regard to drift of the filter. Thus, the invention maintains a side-step frequency precisely centered with respect to the attenuating filter regardless of unstabilized factors. Furthermore, the present invention eliminates the necessity for a separate side-step oscillator in the system, but instead caused the filter to control the side-step frequency.

It is therefore the object of this invention to provide a combined side-step frequency and filtering system, locked together in an oscillatory loop that prevents feed-through of undesired direct-coupled radiation.

Further objects, features and advantages of this invention will become apparent to one skilled in the art upon further study of this specification and the drawings in which:

FIGURE 1 shows only those portions of a doppler radar system directly related to or included with the present invention. One skilled in the art can readily supply conventional radar parts which can cooperate with the invention.

Figure 1:
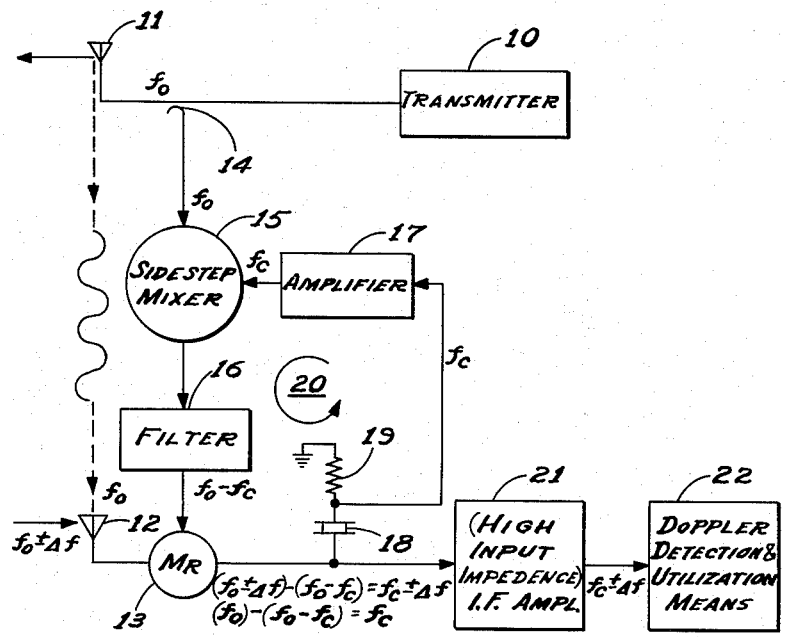
FIGURE 1 illustrates a diagram of the invention.

A transmitter 10 generates a frequency $f_o$ which is to be transmitted. An antenna 11 is coupled to transmitter 10 to radiate energy in a directive pattern toward any desired target which can reflect the energy back to a receiving antenna 12. The transmitted frequency $f_o$ is shifted in frequency by an amount $\Delta f$ proportional to the velocity between the transceiver and the target. Thus, reflected signal frequency will be $(f_o+\Delta f)$ when the distance is decreasing and $(f_o-\Delta f)$ when the distance is increasing.

If made as separate units, the transmitting and receiving antennas 11 and 12 are almost invariably positioned relatively close to each other. Or they may be made a single unit with cross-polarization separation. In any case, it is unavoidable that an element of direct coupling exists between the two antennas, due to the very high level of energy transmitted at $f_o$ compared to the low level of energy reflected at $(f_o \pm \Delta f)$. Hence, there will be a significant amount of direct coupled energy at frequency $f_o$ received by antenna 12 in addition to a much smaller amount of doppler-shifted signal at frequency $(f_o \pm \Delta f)$.

A heterodyning mixer 13 in the receiver has an input that receives the two frequencies $f_o$ and $(f_o \pm \Delta f)$ from antenna 12. Another input of mixer 13 obtains a locally-generated side-step frequency $(f_o-f_c)$ which heterodynes the received frequencies to an intermediate-frequency level. Thus the frequencies $f_o$ and $f_o \pm \Delta f$ are provided at the output of mixer 13 as frequency products $(f_c \pm \Delta f)$ and $f_c$, as shown by the following expressions:

$$(f_o \pm \Delta f)-(f_o-f_c)=f_c \pm \Delta f \qquad (1)$$

$$f_o-(f_o-f_c)=f_c \qquad (2)$$

Accordingly, the direct-coupled frequency $f_o$ appears as frequency $f_c$ at the mixer output and has a substantial greater amplitude than the information-bearing frequency $(f_c \pm \Delta f)$. Unless something is done, $f_c$ may obliterate $(f_c \pm \Delta f)$.

Hence some means must be provided to remove the undesired frequency $f_c$ before applying the mixer output to detection circuitry. Since frequency $f_c$ differs from frequency $(f_c \pm \Delta f)$ by $\Delta f$, which is generally very small percentage wise, extraordinarily narrow bandpass filter is necessary. In the invention, a crystal-filter circuit 18 having a center frequency $f_c$ is connected in series with a pickoff impedance 19 between the output of mixer 13 and ground.

An amplifier 17 has its input connected across pickoff impedance 19.

A side-step mixer 15 has an input connected to the output of amplifier 17 and has another input connected to a probe 14 which obtains a small amount of the transmitter energy at a frequency $f_c$.

In mixer 15, the usual frequency products are generated at its output; and a filter 16 may select either product frequency $(f_o-f_c)$ or $(f_o+f_c)$. However, in FIGURE 1, frequency $(f_o-f_c)$ is used. The output of filter 16 is connected to an input of mixer 13 and completes an oscillatory loop 20 indicated by the circular arrow in FIGURE 1.

Figure 2:
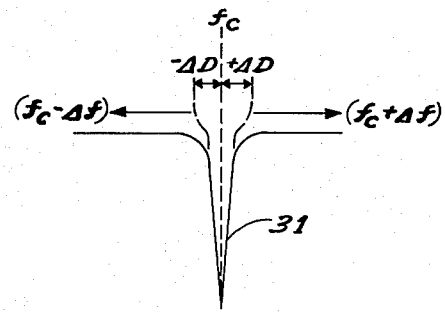
FIGURE 2 illustrates the attenuation versus frequency response of a filtering system used in the invention.

Crystal circuit 18 has a series resonance at frequency $f_o$ with a very narrow bandwith. FIGURE 2 shows a typical attenuation-frequency response curve 31 for crystal circuit 18. Consequently, crystal circuit 18 best passes frequency $f_c$ which is centered in its band; and the gain of loop 20 is greater than one at that frequency. Hence, loop oscillation occurs at frequency $f_c$. It will be noted that frequency $f_c$ does not remain intact about the entire loop 20 but is translated to a higher value over part of the loop. Accordingly, it is heterodyned up to frequency $(f_o - f_c)$ in mixer 15 and is heterodyned down to frequency $(f_c)$ in mixer 13 by the direct-coupled energy only. That is, only the direct-coupled frequency $f_o$ can heterodyne the output $(f_o - f_c)$ of filter 16 to precisely the center frequency $f_c$ of crystal 18.

Any frequency such as the doppler-shifted frequency $(f_o \pm \Delta f)$ which falls outside the narrow bandpass of crystal circuit 18, will not be passed by it.

An intermediate-frequency amplifier 21 is connected to the output of mixer 13. Amplifier 21 preferably has a high input impedance, which may be defined for the purpose of this invention as at least ten times the impedance presented across the series combination of crystal circuit 18 and pickoff resistance 19 at the center frequency $f_c$ of the crystal circuit.

Consequently, frequency $f_c$ is shunted by loop 20 away from the input to intermediate-frequency amplifier 21 yet while $f_c$ is thus shunted, it is put to the useful purpose of side-stepping the heterodyne information frequency $(f_c \pm \Delta f)$ so that it falls within the bandpass of amplifier 21.

A doppler detection and utilization means 22 of conventional form is connected to the output of amplifier 21. Means 22 may include other frequency conversions as well as final detection, which may include a frequency discriminator (not shown) followed by other accessories well known in the art. The discriminator detects the magnitude of $\Delta f$ as well as it sign, upon which directional sense depends.

Since the side-step frequency $f_c$ is always locked with the center frequency $f_c$ of the crystal circuit, due to oscillatory loop 20, the side-step frequency floats with the crystal network frequency, regardless of any instability which it may have. Hence, the undesirably coupled energy component $f_c$ occurring at the output of mixer 13 always aligns with the center frequency of crystal 18 and bypasses the input to intermediate-frequency amplifier 21. Thus, temperature shift of the crystal frequency does not affect the operation of the system.

The desired frequency component $(f_o \pm \Delta f)$ can come very near to frequency $f_c$ before being significantly shunted by the low-impedance crystal network. As shown in FIGURE 2, the information-frequency component $\pm \Delta f$ is not affected by the crystal-frequency response 31 until $\Delta f$ becomes less than $\Delta D$, where $2\Delta D$ is the significant width of crystal response curve 31. Crystal circuit 18 can be either a single crystal, or a crystal-lattice network. In most cases, the Q requirements allow only a crystal or crystal lattice network to be feasible, although at low frequencies a mechanical-resonant device may be used.

Although this invention has been described with respect to a particular embodiment thereof, it is not to be so limited as changes and modifications may be made therein which are within the full intended scope of the invention as defined by the appended claims.

I claim:

1. Means for attenuating frequencies cross-coupled from a transmitter to a receiver in a doppler-radar system, comprising a side-step mixer, a probe coupled between the output of said transmitter and one input of said side-step mixer, an amplifier having an output connected to a second input of said side-step mixer, a filter connected to an output of said mixer and selecting a mixer frequency product, a first heterodyning mixer of said receiver having an input connected to the output of said filter, a crystal-filter network and a pickoff impedance connected in series to the output of said heterodyning mixer, an input of said amplifier connected to said pickoff impedance and an intermediate-frequency amplifier in said receiver having an input connected to the output of said heterodyning mixer, said crystal-filter network being series resonant at a sidestep frequency, and the input of said intermediate frequency amplifier having an input impedance many times greater than a combined impedance of said pickoff impedance and said crystal network at a resonant frequency of said crystal network.

2. Means for locking a side-step frequency to a bandpass filter in a doppler-radar system having a transmitter and receiver connected to an antenna system, said receiver including a first heterodyning mixer having a pair of inputs, with one input connected to said antenna system, and an intermediate-frequency amplifier connected to an output of said heterodyning mixer, a by-pass filter comprising a crystal circuit and a pickoff impedance connected serially to the output of said heterodyning mixer, said crystal circuit being series resonant at said side-step frequency, amplification means having an input connected across said pickoff impedance, a sidestep mixer having a pair of inputs with one input connected to an output of said amplification means, a probe connecting another input of said side-step mixer to an output of said transmitter, a filter connected between an output of said side-step mixer and the other input of said heterodyning mixer, and the input impedance of said intermediate-frequency amplifier being at least ten times greater than a combined series impedance of said crystal circuit and said pickoff impedance at a resonant frequency of said crystal circuit.

3. Means for locking a side-step frequency to a by-pass filter in a doppler-radar system with a transmitter and a receiver connected to a joint antenna system, comprising a side-step frequency mixer with a pair of inputs, means for coupling one of said inputs to an output of said transmitter, a selecting filter connected to the output of said side-step mixer, said receiver including a heterodyner and an intermediate-frequency amplifier connected to an output of said heterodyner, said heterodyner having a pair of inputs, with means connecting one input to said antenna system, and another input connected to said selecting filter, said by-pass filter comprising a crystal filter and a resistance means connected in series between ground and the output of said heterodyner, said crystal filter being series resonant at said side-step frequency, a side-step amplifier having an input connected across said resistance means, an output of said sidestep amplifier connected to the other input of said side-step mixer, and the input impedance of said intermediate-frequency amplifier being greater than ten times the series resistance of said bypass filter and crystal filter at the side-step frequency.

References Cited in the file of this patent

UNITED STATES PATENTS 2,541,066   Jaynes _____ Feb. 13, 1951